United States Patent Office 3,567,719
Patented Mar. 2, 1971

3,567,719
METHODS FOR PREPARING DYES AND
NOVEL DYE INTERMEDIATES
Carl H. Eldredge and John D. Mee, Rochester, N.Y., assignors to Eastman Kodak Company, Rochester, N.Y.
No Drawing. Filed May 17, 1967, Ser. No. 639,050
Int. Cl. C09b 23/10
U.S. Cl. 260—240.4
6 Claims

ABSTRACT OF THE DISCLOSURE

Novel compounds of the formula

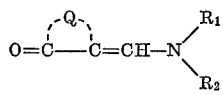

where Q represents the atoms to complete a nucleus of from 5 to 6 atoms, and $R_1$ and $R_2$ each represents a lower alkyl group, the preparation of these compounds by heating a compound of the formula

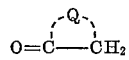

with an inorganic acid halide and dialkyl formamide, and the preparation of merocyanine dyes with these compounds as starting material are described.

---

This invention relates to a new class of reactive dye intermediates, the preparation of these intermediates and the preparation of merocyanine dyes with these intermediates.

Acetanilidomethylene derivatives of heterocyclic compounds having an alpha-ketomethylene group have been suggested as intermediates for the preparation of merocyanine dyes. However, these intermediates may have poor solubility, and produce dyes in relatively low yields and low states of purity. We have now found a new class of compounds, which are derivatives of heterocyclic compounds having an alpha-ketomethylene group. These new compounds are easy to prepare. They have good solubility in media used in dye synthesis, and provide dyes of excellent purity in unexpectedly high yields.

It is, accordingly, one object of this invention to provide novel dye intermediates.

Another object of this invention is to provide novel dye intermediates which have good solubility characteristics.

A further object of this invention is to provide novel dye intermediates which result in the production of dyes in high yields.

Still another object of this invention is to provide novel dye intermediates which result in the production of dyes in a high state of purity.

Another object of this invention is to provide a novel method for preparing merocyanine dyes.

Another object of this invention is to provide a novel method for preparing merocyanine dyes using the novel compounds of this invention.

Other objects of this invention will become apparent from this disclosure and the appended claims.

In accordance with one embodiment of this invention, novel dye intermediates are provided which have the following general formula:

I.
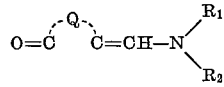

wherein $R_1$ and $R_2$ each represents an alkyl group, preferably a lower alkyl containing from 1 to 4 carbon atoms, e.g., methyl, ethyl, propyl, isopropyl, butyl, etc., and Q represents the non-metallic atoms required to complete a heterocyclic nucleus containing from 5 to 6 atoms in the heterocyclic ring, which ring preferably contains from 3 to 4 carbon atoms, 1 nitrogen atom and 1 atom selected from the group consisting of a nitrogen atom, an oxygen atom and a sulfur atom, such as a 2-pyrazolin-5-one nucleus (e.g., 3 - methyl-1-phenyl-2-pyrazolin-5-one, 1-phenyl - 2 - pyrazolin - 5 - one, 1 - (2 - benzothiazolyl)-3-methyl - 2 - pyrazolin-5-one, etc.), a 2-isoxazolin-5-one nucleus (e.g., 3 - phenyl-2-isoxazolin-5-one, 3-methyl-2-isoxazolin - 5 - one, etc.), an oxindole nucleus (e.g., 1-alkyl-2,3-dihydro-2-oxindoles, etc.), a 2H-pyrido[1,2-a]pyrimidine - 2,4(3H) - dione nucleus, a 2,4,6-triketohexahydropyrimidine nucleus (e.g., barbituric acid or 2-thiobarbituric acid as well as their 1-alkyl (e.g., 1-methyl, 1-ethyl, 1-propyl, 1-heptyl, etc.), or 1,3-dialkyl (e.g., 1,3-dimethyl, 1,3-diethyl, 1,3-dipropyl 1,3-diisopropyl, 1,3-dicyclohexyl, 1,3-di($\beta$-methoxyethyl), etc.), or 1,3-diaryl (e.g., 1,3 - diphenyl, 1,3-di(p - chlorophenyl), 1,3-di(p-ethoxycarbonylphenyl), etc.), or 1-aryl (e.g., 1-phenyl, 1 - p - chlorophenyl, 1-p-ethoxycarbonylphenyl), etc.) or 1 - alkyl - 3 - aryl (e.g., 1-ethyl-3-phenyl, 1-n-heptyl-3-phenyl, etc.) derivatives), a rhodanine nucleus (i.e., a 2-thio - 2,4 - thiazolidinedione nucleus), such as rhodanine, 3 - alkylrhodanines (e.g., 3-ethylrhodanine, 3-allylrhodanine, etc.), 3-carboxyalkylrhodanines (e.g., 3-(2-carboxyethyl)rhodanine, 3 - (4 - carboxybutyl)rhodanine, etc.), 3-sulfoalkylrhodanines (e.g., 3-(2-sulfoethyl)rhodanine, 3 - (3 - sulfopropyl)rhodanine, 3-(4-sulfobutyl)rhodanine, etc.), or 3 - arylrhodanines (e.g., 3-phenylrhodanine, etc.), etc., a 2(3H) - imidazo[1,2-a]pyridone nucleus, a 5,7-dioxo - 6,7 - dihydro-5-thiazolo[3,2-a]pyrimidine nucleus (e.g., 5,7 - dioxo-3-phenyl-6,7-dihydro-5-thiazolo[3,2-a]pyrimidine, etc.), a 2 - thio - 2,4-oxazolidinedione nucleus (i.e., a 2-thio-2,4(3H,5H)oxazolidione nucleus) (e.g., 3 - ethyl - 2 - thio-2,4-oxazolidinedione, 3-(2-sulfoethyl)-2 - thio - 2,4 - oxazolidinedione, 3-(4-sulfobutyl)-2-thio-2,4 - oxazolidinedione, 3 - (3-carboxypropyl)-2-thio-2,4-oxazolidinedione, etc.), a thianaphthenone nucleus (e.g., 3 - (2H) - thianaphthenone, etc.), a 2-thio-2,5-thiazolidinedione nucleus (i.e., a 2-thio-2,5-(3H,4H)-thiazoledione nucleus) (e.g., 3 - ethyl-2-thio-2,5-thiazolidinedione, etc.), a 2,4-thiazolidinedione nucleus (e.g., 2,4-thiazolidinedione, 3 - ethyl - 2,4-thiazolidinedione, 3-phenyl-2,4-thiazolidinedione, 3 - $\alpha$ - naphthyl-2,4-thiazolidinedione, etc.), a thiazolidinone nucleus (e.g., 4-thiazolidinone, 3-ethyl - 4 - thiazolidinone, 3-phenyl-4-thiazolidinone, 3-$\alpha$-naphthyl - 4 - thiazolidinone, etc.), a 2-thiazolin-4-one nucleus (e.g., 2 - ethylmercapto-2-thiazolin-4-one, 2-alkylphenylamino - 2 - thiazolin-4-one, 2-diphenylamino-2-thiazolin - 4 - one, etc.), a 2-imino-4-oxazolidinone (i.e., pseudohydantoin) nucleus, a 2,4 - imidazolidinedione (hydantoin) nucleus (e.g., 2,4 - imidazolidinedione, 3-ethyl-2,4 - imidazolidinedione, 3-phenyl-2,4-imidazolidinedione, 3 - $\alpha$ - naphthyl-2,4-imidazolidinedione, 1,3-diethyl-2,4-imidazolidinedione, 1 - ethyl - 3 - phenyl-2,4-imidazolidinedione, 1-ethyl - 3 - $\alpha$-naphthyl-2,4-imidazolidinedione 1,3 - diphenyl - 2,4 _ imidazolidinedione, etc.), a 2-thio-2,4 - imidazolidinedione (i.e., 2-thiohydantoin) nucleus (e.g., 2 - thio - 2,4 - imidazolidinedione, 3-ethyl-2-thio-2,4 - imidazolidinedione, 3 - (4-sulfobutyl)-2-thio-2,4-imidazolidinedione, 3 - (2 - carboxyethyl)-2-thio-2,4-imidazolidinedione, 3 - phenyl - 2 _ thio-2,4-imidazolidinedione, 3 - $\alpha$ - naphthyl-2-thio-2,4-imidazolidinedione, 1,3-diethyl - 2 - thio-2,4-imidazolidinedione, 1-ethyl-3-phenyl-2 - thio - 2,4-imidazolidinedione, 1-ethyl-3-$\alpha$-naphthyl-2-thio - 2,4 - imidazolidinedione, 1,3-diphenyl-2-thio-2,4-imidazolidinedione, etc.), a 2-imidazolin-5-one nucleus (e.g., 2 - propylmercapto-2-imidazolin-5-one, etc.), etc. The above defined compounds as previously mentioned, are useful as intermediates for the preparation of various cyanine dye sensitizers for photographic silver halide emulsions. They have good solubility in media commonly employed in dye synthesis. The subject intermediates are highly useful in synthesizing merocyanine dyes in a highly pure state, and in excellent yields. A number of these new compounds are particularly useful for the preparation of desensitizing cyanine dyes which function as electron acceptors and spectral sensitizers for direct positive photographic emulsions. Included in this group are those wherein Q of above Formula I represents the atoms required to complete a 2H - pyrido[1,2-a]pyrimidine-2,4(3H)-dione nucleus, a 2-thiobarbituric acid nucleus, or a rhodanine nucleus. Of these, the pyrimidinedione type of compound is especially useful for this purpose and is the preferred species of this invention.

In another embodiment of this invention, dye intermediates defined by Formula I above are prepared by first reacting an inorganic acid halide, such as sulfuryl chloride or, preferably, phosphoryl chloride (POCl₃) with a dialkylformamide of the formula:

II. 

wherein $R_1$ and $R_2$ are as previously defined, to form the "Vilsmeier" complex. Preferably, a relatively large excess of the amide is used, i.e., greater than 1 mol. formamide per mole of inorganic acid halide. Then, there can be added to this mixture a compound represented by the formula:

III. 

wherein Q is as previously defined, preferably in the proportions of approximately 1 mole of the compound of Formula III to each mole of the Vilsmeier complex, followed by heating the reaction mixture, for example on a steam bath, to complete the reaction. After chilling, the solid which forms is separated from the reaction mixture and purified, when desired, by one or more recrystallizations from appropriate solvents such as dimethylformamide alone or from mixtures thereof with methanol.

In still another embodiment of this invention, a method is provided for the preparation of merocyanine dyes of the formula:

IV. 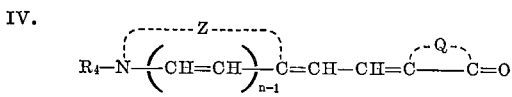

wherein Q has the meaning given above, and $R_4$, Z and $n$ have the values given below, by heating a compound having Formula I above with a compound having the formula:

V. 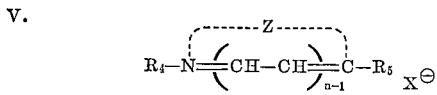

wherein $n$ represents a positive integer of from 1 to 2; $R_5$ represents methyl; $R_4$ represents an alkyl group, including substituted alkyl (preferably a lower alkyl containing from 1 to 4 carbon atoms) e.g., methyl, ethyl, propyl, isopropyl, butyl, hexyl, cyclohexyl, decyl, dodecyl, etc., and substituted alkyl groups (preferably a substituted lower alkyl containing from 1 to 4 carbon atoms), such as an alkoxyalkyl group, e.g., β-methoxyethyl, ω-butoxybutyl, etc., a carboxyalkyl group, e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc., and the like; an alkenyl group, e.g., allyl, 1-propenyl, 2-butenyl, etc., or, any aryl group, e.g., phenyl, tolyl, naphthyl, methoxyphenyl, chlorophenyl, etc.; and, Z represents the non-metallic atoms required to complete a heterocyclic nucleus containing from 5 to 6 atoms in the heterocyclic ring, such as a thiazole nucleus (including a benzothiazole nucleus or a naphthothiazole nucleus), an oxazole nucleus (including a benzoxazole nucleus or a naphthoxazole nucleus), a selenazole nucleus (including a benzoselenazole nucleus or a naphthoselenazole nucleus), a thiazoline nucleus, a 2-quinoline nucleus, a 4-quinoline nucleus, a 3,3-dialkylindolenine nucleus, a 2-pyridine nucleus, or a 4-pyridine nucleus, reference being made to Kendall and Stewart U.S. Patent 3,128,179, issued Apr. 7, 1964, column 3, line 27 through column 4, line 13, for specific useful examples of the nuclei referred to above, and, preferably, Z can represent the non-metallic atoms required to complete a desensitizing heterocyclic nucleus (defined below) containing from 5 to 6 atoms in the heterocyclic ring, such as a nitrobenzothiazole nucleus, e.g., 5-nitrobenzothiazole, 6-nitrobenzothiazole, 5-chloro-6-nitrobenzothiazole, etc.; a nitrobenzoxazole nucleus, e.g., 5 - nitrobenzoxazole, 6-nitrobenzoxazole, 5-chloro-6-nitrobenzoxazole, etc.; a nitrobenzoselenazole nucleus, e.g., 5-nitrobenzoselenazole, 6-nitrobenzoselenazole, 5-chloro-6-nitrobenzoselenazole, etc.; an imidazo[4,5-b]kuinoxaline nucleuc (as described in Brooker and Van Lare, U.S. patent application Ser. No. 609,791, filed Jan. 17, 1967, now U.S. Patent 3,431,111 issued Mar. 4, 1969) e.g., imidazo[4,5-b]quinoxaline, 1,3-dialkylimidazo[4,5-b]quinoxaline such as 1,3-diethylimidazo[4,5-b]quinoxaline, 6 - chloro - 1,3 - diethylimidazo[4,5-b]quinoxaline, etc., 1,3 - dialkenylimdiazo[4,5-b]quinoxaline such as 1,3 - diallylimidazo[4,5-b]quinoxaline, 6 - chloro- 1,3 - diallylimidazo[4,5-b]quinoxaline, etc., 1,3 - diarylimidazo[4,5-b]quinoxaline such as 1,3 - diphenylimidazo[4,5-b]quinoxaline, 6 - chloro - 1,3 - diphenylimidazo [4,5-b]quinoxaline, etc.; and, 3 - dialkyl - 3H - pyrrolo [2,3-b]pyridine nucleus, e.g., 3,3 - dimethyl-3H-pyrrolo [2,3-b]pyridine, 3,3 - diethyl - 3H - pyrrolo[2,3-b]pyridine, etc.; an indolenine nucleus such as a 3,3-dialkyl-3H-nitroindole, e.g., 3,3 - dimethyl-5-nitro-3H-indole, 3,3-diethyl - 5 - nitro-3H-indole, 3,3-dimethyl-6-nitro-3H-indole, etc.; a thiazolo[4,5-b]quinoline nucleus; or a nitroquinoline, e.g., 5-nitroquinoline, 6-nitroquinoline, etc.; and, X represents an acid anion (e.g., chloride, iodide, etc.) which may be combined with $R_4$, such as when $R_4$ represents sulfoalkyl.

The dye preparation of the invention described above is preferably carried out at elevated temperatures, such as up to about 100° C. At such temperatures, reaction is usually complete within about 10 minutes. However, lower temperatures can be used with the reaction proceeding somewhat slower. Intermediates of Formulas I and V can be present in any suitable concentrations relative to one another, such as, preferably, substantially equivalent molar concentrations. Reaction can be conducted in any suitable reaction medium, preferably a reaction medium such as an acid anhydride, e.g., acetic anhydride, or in a formamide such as dimethylformamide. A condensing agent can be used, such as triethylamine or piperidine.

As used herein and in the appended claims, "desensitizing nucleus" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 gram dye per mole of silver, cause by electron trapping at least about an 80 percent loss in the blue speed of the emulsion when sensitometrically exposed and developed three minutes in Kodak developer D-19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95% loss of speed to blue radiation). The method of preparing dyes according to this invention is especially useful in synthesis of merocyanine dyes wherein Z in Formula IV above represents the atoms to complete such a desensitizing nucleus. The yield of such dyes is much higher, and the dyes are obtained in a much higher state of purity than when

EXAMPLE 1

1,3-diethyl-5-dimethylaminomethylene-2-thiobarbituric acid

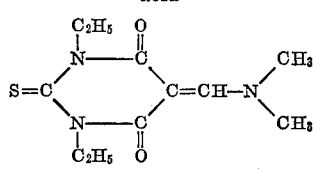

Phosphoryl chloride (10 ml., 1.1 mol.) is added slowly to dimethyl formamide (100 ml.) with ice-bath cooling. 1,3-diethyl-2-thiobarbituric acid (20.0 g., 1 mol.) is added in one lot and an exothermic reaction occurs. The mixture is allowed to cool to 25° C., then heated to 50° C. on a steambath. The mixture is chilled, the solid collected and washed with a small volume of dimethyl formamide. After one recrystallization from dimethyl formamide, the yield of purified product is 8.41 g. (33%), M.P. 144–147° C.

In place of the 1,3-diethyl-2-thiobarbituric acid in the above example, there can be substituted a like molar amount of 1,3-diethylbarbituric acid to give the corresponding 1,3-diethyl-5-dimethylaminomethylene barbituric acid. Also, the dimethylformamide can be substituted, for example, by diethylformamide to give the corresponding compounds 1,3 - diethyl-5-diethylaminomethylene-2-thiobarbituric acid and 1,3-diethyl-5-diethylaminomethylene barbituric acid.

EXAMPLE 2

3-dimethylaminomethylene-2H-pyrido[1,2-a]pyrimidine-2,4(3H)dione

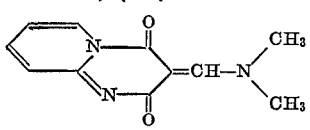

Phosphoryl chloride (10 ml., 1.1 mol.) is added slowly to dimethyl formamide (100 ml.) with ice-bath cooling. 2H-pyrido[1,2-a]pyrimidine-2,4(3H)-dione (16.2 g., 1 mol.) is added and the mixture heated on a steam-bath for 1½ hours. After chilling, the solid is collected and washed with MeOH. The yield of crude product is 21.2 g. (98%), M.P. 262–263° C. This material can be used for dye synthesis without further purification.

EXAMPLE 3

3-ethyl-5-dimethylaminomethylenerhodanine

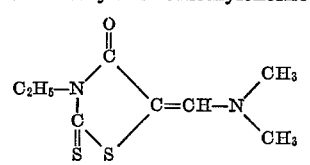

Phosphoryl chloride (10 ml., 1.1 mol.) is added slowly to dimethyl formamide (100 ml.), with ice-bath cooling. 3-ethylrhodanine (16.1 g., 1 mol.) is added and the mixture heated on a steam-bath for ½ hour. After chilling, the yellow solid is collected and washed with methanol. After one recrystallization from dimethyl formamide/methanol, the yield of purified product is 11.24 g. (52%), M.P. 163–165° C.

In place of the 3-ethylrhodanine in the above example, there can be substituted a like molar amount of other 3-alkyl (e.g., methyl, propyl, isopropyl, butyl, etc.) rhodanines to give the corresponding 3-alkyl-5-dimethylaminomethylenerhodanines. The dimethylformamide can also be substituted in the above example by a like amount of other dialkylformamides defined by above Formula II to give the corresponding compounds, for example, 3-ethyl-5-diethylaminomethylenerhodanine by employing diethylformamide.

The following examples illustrate the preparation of certain merocyanine dyes employing a preferred dye intermediate compound of this invention.

EXAMPLE 4

3-[(1,3 - diethyl - 1H - imidazo[4,5-b]quinoxalin - 2(3H)-ylidene)ethylidene] - 2H - pyrido[1,2-a]pyrimidine-2,4(3H)-dione

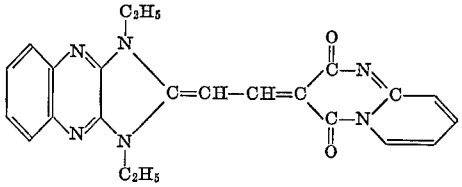

1,3 - diethyl - 2 - methylimidazo[4,5-b]quinoxalinium p-toluenesulfonate (4.12 g., 1 mol.), 3-dimethylaminomethylene-2H-pyrido[1,2-a]pyrimidine - 2,4(3H) - dione (2.17 g., 1 mol.) and triethylamine (1.55 ml., 1.1 mol.) in dimethyl formamide (25 ml.) are heated for 1 hour on a steam-bath. The mixture is then heated to 140° C. After chilling, the solid is collected and washed with methanol. The yield of highly pure dye is 2.57 g. (63%), M.P. 284.0–284.5° C. dec.

EXAMPLE 5

3 - [(6 - chloro - 1,3 - diphenyl - 1H - imidazo[4,5-b]quinoxalin - 2(3H) - ylidene)ethylidene] - 2H-pyrido[1,2-a]pyrimidine-2,4(3H)-dione

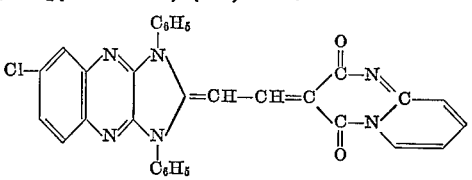

6 - chloro - 1,3 - diphenyl - 2 - methylimidazo[4,5-b]quinoxalinium p-toluenesulfonate (2.71 g., 1 mol.) and 3-dimethylaminomethylene-2H - pyrido[1,2-a]pyrimidine-2,4(3H)-dione (1.10 g., 1 mol.) in acetic anhydride are heated at a gentle reflux for 5 minutes. The mixture is chilled and diluted with ether (100 ml.). The solid is collected and washed thoroughly with ether. The solid is digested with ethanol (40 ml.) containing diazabicyclooctane (0.3 g.), the suspension chilled, and the solid collected. The dye is purified by precipitation from m-cresol solution by addition of methanol containing diazabicyclooctane. The yield of highly pure dye is 1.71 g. (63%), M.P. 307–308° C., dec.

In place of the 6-chloro-1,3-diphenyl-2-methylimidazo[4,5-b]quinoxalinium p-toluenesulfonate in the above example, there can be substituted an equivalent amount of other intermediates such as a 3-alkyl (e.g., methyl, ethyl, propyl, isopropyl, butyl, hexyl, decyl, dodecyl, etc.) -2-methyl-6-nitrobenzoxazolium quaternary salt, e.g., the chloride, bromide, iodide, perchlorate, p-toluenesulfonate, etc. salts, or a 3-alkyl (e.g., methyl, ethyl, propyl, isopropyl, butyl, hexyl, decyl, dodecyl, etc.) -2-methyl-6-nitrobenzoselenazolium quaternary salts, e.g., the chloride, bromide, iodide, perchorate, p-toluenesulfonate, etc. salts, and the like, to give the corresponding merocyanine dyes having generally similar electron accepting and spectral sensitizing properties, for example, the dye 3-[(3-ethyl - 6 - nitro - 2 - benzoxazolinylidene)ethylidene]-2H-pyrido[1,2 - a]pyrimidine - 2,4(3H) - dione, the dye 3-[(3-ethyl-6-nitro - 2 - benzoselenazolinylidene)ethylidene]-2H-pyrido[1,2-a]pyrimidine-2,4-dione, etc. The 3-dimethylaminomethylene - 2H - pyrido[1,2 - a]pyrimidine - 2,4 (3H)-dione reactant can also be substituted in the above example by an equimolar amount of other related compounds coming under Formula I above such as, for example, 3-dimethylaminomethylene - 2H - pyrimido[2,1-b]

benzothiazole-2,4(3H)-dione, or 3-dimethylaminomethylene-2H-pyrimido[1,2-a]benzimidazole - 2,4(3H) - dione, etc., to give the corresponding merocyanine dyes having generally similar electron acceptor and spectral sensitizer properties.

The dyes which can be prepared using the methods and intermediates of this invention are highly useful sensitizers for photographic silver halide emulsions. Some of these dyes, such as those illustrated by above Examples 4 and 5, containing a desensitizing nucleus such as an imidazo[4,5-b]quinoxaline nucleus, are particularly useful as electron acceptors and spectral sensitizers for direct positive photographic silver halide emulsions, as disclosed and claimed in copending application of Webster and Heseltine, Ser. No. 639,024, filed concurrently herewith.

It will be apparent from the foregoing, that other compounds of the invention as defined by Formula I above can be readily prepared by the procedures of the preceding Examples 1 to 3 by appropriate selection of Vilsmeier complexes (Formula II compound plus inorganic acid halide) and reactants of Formula III above. It will also be apparent that the compounds of the invention are well suited to function as intermediates for the preparation of various other merocyanine dyes by the general procedures of above Examples 4 and 5.

We claim:

1. The method for preparing merocyanine dyes having the formula:

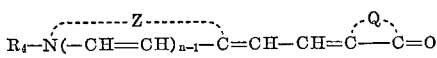

wherein Z represents the non-metallic atoms required to complete a nucleus containing from 5 to 6 atoms selected from the group consisting of a thiazole nucleus, an oxazole nucleus, a selenazole nucleus, a thiazoline nucleus, a 2-quinoline nucleus, a 4-quinoline nucleus, an indolenine nucleus, a 2-pyridine nucleus, a 4-pyridine nucleus, an imidazo[4,5-b]quinoxaline nucleus, and a 3-H-pyrrolo[2,3-b]pyridine nucleus; $n$ represents a positive integer of from 1 to 2; $R_4$ represents a member selected from the group consisting of alkyl containing from 1 to 4 carbon atoms, an alkoxyalkyl group wherein the alkoxy and alkyl moieties each contain 1 to 4 carbon atoms, a carboxyalkyl group containing from 1 to 4 carbon atoms in the alkyl moiety, a sulfoalkyl group containing from 1 to 4 carbon atoms, a sulfatoalkyl group containing from 1 to 4 carbon atoms, an acyloxyalkyl group wherein the alkyl moiety contains 1 to 4 carbon atoms and the acyl moiety contains 2 to 4 carbon atoms, an alkoxycarbonylalkyl group wherein the alkoxy moiety contains 1 to 2 carbon atoms and the alkyl moiety contains 2 to 4 carbon atoms, a phenylalkyl containing 1 to 2 carbon atoms in the alkyl moiety, an alkenyl group containing 1 to 4 carbon atoms, a phenyl group and a naphthyl group, and Q represents the non-metallic atoms required to complete a 5 to 6 membered heterocyclic nucleus selected from the group consisting of a 2-pyrazolin-5-one nucleus, a 2-isoxazolin-5-one nucleus, an oxindole nucleus, a 2H-pyrido[1,2-a]pyrimidine-2,4(3H)-dione nucleus, a 2,4,6-triketohexahydropyrimidine nucleus, a rhodanine nucleus, a 2(3H)-imidazo[1,2-a]pyridone nucleus, a 5,7-dioxo-6,7-dihydro-5-thiazolo[3,2-a]pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 2-thiazolin-4-one nucleus, a 2-imino-4-oxazolidinone nucleus, a 2,4-imidazolidinedione nucleus, a 2-thio-2,4-imidazolidinedione nucleus, and a 2-imidazolin-5-one nucleus, which comprises reacting a compound of the general formula:

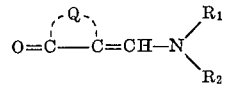

wherein Q has the meaning given above; and $R_1$ and $R_2$ each represents a lower alkyl group containing from 1 to 4 carbon atoms, with a compound having the formula:

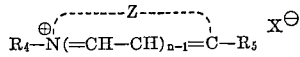

wherein $R_4$, $n$ and Z have the meanings given above; $R_5$ represents a methyl group and X represents an acid anion.

2. The method as defined in claim 1 wherein said Z represents the atoms required to complete a desensitizing heterocyclic nucleus selected from the group consisting of a nitrobenzoxazole nucleus, a nitrobenzothiazole nucleus, a nitrobenzoselenazole nucleus, an imidazo[4,5-b]quinoxaline nucleus, a 3-dialkyl-3H-pyrrolo[2,3-b]pyridine nucleus, a nitro substituted indolenine nucleus, a nitroquinoline nucleus and a thiazolo[4,5-b]quinoline nucleus; said $R_1$ and $R_2$ each represents a methyl group; and said reaction is conducted at a temperature of from 100° C. to 140° C. in a solvent medium.

3. The method as defined in claim 2 wherein said Q represents the atoms necessary to complete a nucleus selected from the group consisting of a 2H-pyrido[1,2-a]pyrimidine-2,4(3H)-dione nucleus, a 2-thiobarbituric acid nucleus and a rhodanine nucleus.

4. The method as defined in claim 3 wherein said Z represents the atoms necessary to complete an imidazo[4,5-b]quinoxaline nucleus.

5. The method for preparing 3 - [(1,3 - diethyl - 1H-imidazo[4,5 - b]quinoxaline - 2(3H) - ylidene)ethylidene]-2H - pyrido[1,2 - a]pyrimidine-2,4(3H)-dione which comprises heating a mixture of 1,3-diethyl-2-methylimidazo[4,5-b]quinoxalinium p - toluenesulfonate, 3 - dimethylaminomethylene - 2H-pyrido[1,2-a]pyrimidine-2,4(3H)-dione and triethylamine in dimethylformamide.

6. The method for preparing 3-[(6-chloro-1,3-diphenyl - 1H - imidazo[4,5 - b]quinoxaline - 2(3H) - ylidene)ethylidene]2H - pyrido[1,2 - a]pyrimidine-2,4(3H)-dione which comprises refluxing a mixture of 6-chloro-1,3-diphenyl-2-methylimidazo[4,5-b]quinoxalinium p-toluenesulfonate and 3-dimethylaminomethylene-2H-pyrido[1,2-a]pyrimidine-2,4(3H)-dione in acetic anhydride.

References Cited
UNITED STATES PATENTS 2,548,571   4/1951   Van Lare et al.   260—240.4
2,713,579   7/1955   Knott   260—240.1

OTHER REFERENCES

Hamer, The Cyanine Dyes and Related Compounds, pages 537 to 539, Interscience Publishers (New York) (1964).

Chien-Pen Lo, J. Am. Chem. Soc., vol. 80, pages 3466 to 3468 (1958).

Bredereck et al., Chem. Ber. vol. 98, pages 131 to 132 and 136 (1965).

Chemical Abstracts vol. 63, cols. 18310 to 18311 (1965) (abstract of Lepikhova et al.).

JOHN D. RANDOLPH, Primary Examiner

U.S. Cl. X.R.

96—106; 260—256.4, 256.5, 306.7, 307, 309.5